(12) United States Patent
Singh et al.

(10) Patent No.: US 8,346,270 B1
(45) Date of Patent: Jan. 1, 2013

(54) METHOD AND SYSTEM OF AVOIDING MISSED TUNEAWAYS

(75) Inventors: Jasinder P. Singh, Olathe, KS (US); Maulik K. Shah, Overland Park, KS (US); Anthony K. Leung, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 252 days.

(21) Appl. No.: 12/882,181

(22) Filed: Sep. 14, 2010

(51) Int. Cl.
*H04W 40/00* (2009.01)

(52) U.S. Cl. ............... 455/445; 455/67.11; 455/451; 370/237

(58) Field of Classification Search ............ 455/445, 455/67.11, 451, 452.1, 452.2, 453, 8, 9; 370/237, 370/395.31
See application file for complete search history.

(56) References Cited

U.S. PATENT DOCUMENTS

| | | | |
|---|---|---|---|
| 5,696,908 A * | 12/1997 | Muehlberger et al. | 705/39 |
| 6,865,169 B1 * | 3/2005 | Quayle et al. | 370/335 |
| 7,079,859 B2 * | 7/2006 | Nobukiyo et al. | 455/522 |
| 7,292,825 B2 * | 11/2007 | Beale et al. | 455/67.11 |
| 7,409,216 B2 * | 8/2008 | Moon et al. | 455/437 |
| 7,630,733 B2 * | 12/2009 | Usuda et al. | 455/522 |
| 7,738,423 B2 * | 6/2010 | Khan | 370/331 |
| 7,821,992 B2 * | 10/2010 | Chun et al. | 370/329 |
| 7,920,888 B2 * | 4/2011 | Beming et al. | 455/522 |
| 7,925,271 B2 * | 4/2011 | Ranta-Aho et al. | 455/453 |
| 7,937,453 B1 * | 5/2011 | Hayden et al. | 709/219 |
| 8,010,108 B2 * | 8/2011 | Randall et al. | 455/436 |
| 8,170,569 B2 * | 5/2012 | Kuningas et al. | 455/450 |
| 2003/0152049 A1 | 8/2003 | Turner | |
| 2004/0072565 A1 * | 4/2004 | Nobukiyo et al. | 455/436 |
| 2006/0176870 A1 | 8/2006 | Joshi et al. | |
| 2006/0187844 A1 * | 8/2006 | Chun et al. | 370/242 |
| 2007/0049316 A1 * | 3/2007 | Beming et al. | 455/522 |
| 2007/0097922 A1 | 5/2007 | Parekh | |
| 2007/0140207 A1 | 6/2007 | Narushima | |
| 2007/0153719 A1 | 7/2007 | Gopal | |
| 2007/0190963 A1 | 8/2007 | Ananthanarayanan et al. | |
| 2008/0075039 A1 | 3/2008 | Srinivas | |
| 2008/0207227 A1 | 8/2008 | Ren et al. | |
| 2009/0080364 A1 | 3/2009 | Song et al. | |
| 2011/0145435 A1 * | 6/2011 | Bhatawdekar et al. | 709/238 |
| 2012/0094704 A1 * | 4/2012 | Wang et al. | 455/509 |

OTHER PUBLICATIONS

Doru Calin, "Adaptive Neighbor List Management in Wireless Communication Systems," Global Telecommunications Conference (2006).

* cited by examiner

*Primary Examiner* — Minh D Dao

(57) ABSTRACT

A method and system for avoiding missed tuneaways from a first wireless link configured according to a first protocol to a second wireless link configured according to a second protocol. An access network providing the first wireless link may receive, from one or more of a group of hybrid access terminals assigned to given cycles/timeslots of the first wireless link, reports of missed tuneaways from the first wireless link to the second wireless link. Based on the received reports, the access network may determine that the group of hybrid access terminals (or a given one of the group) has missed a threshold extent of tuneaways. In response, the access network may decide to reduce an amount of control-channel data to send on the first wireless link during the given cycles/timeslots and then begin to send a reduced amount of control-channel data on the first wireless link during the given cycles/timeslots.

20 Claims, 5 Drawing Sheets

METHOD AND SYSTEM OF AVOIDING MISSED TUNEAWAYS

BACKGROUND

To provide cellular wireless communication service, a wireless service provider typically employs an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward-traffic channels, for carrying communications from the access network to the access terminals. As another example, each wireless link may include a plurality of reverse-link channels, such as reverse-traffic channels, for carrying communications from the access terminals to the access network. Typically, the number of channels on a given wireless link, and thus the number of simultaneous communications the given wireless link can carry, is limited by hardware and/or protocol constraints. As such, an access network may try to conserve its limited supply of wireless link channels.

One common way an access network conserves channels is by employing a paging process to locate idle access terminals before assigning a traffic channel to those access terminals. For instance, when an access network receives a request to set up a communication with an idle access terminal operating in the access network, the access network may send a first page message for receipt by the idle access terminal in a first paging area, which may include one or more coverage areas (or portions thereof) that are near a reference location (e.g., the idle access terminal's last-known location). If the idle access terminal is located in the first paging area and responds to the first page message, the access network may then assign a traffic channel to the idle access terminal. Alternatively, if the idle access terminal is not located in the first paging area and/or does not respond to the first page message, the access network may send a second page message for receipt by the idle access terminal in a second paging area, which may include the first paging area and/or one or more other coverage areas (or portions thereof). The access network may continue this process until it locates the idle access terminal, pages the idle access terminal in all coverage areas, and/or reaches a time or attempt limit. This paging process may thus enable the access network to locate the idle access terminal before assigning a traffic channel to the idle access terminal.

For various reasons, a wireless carrier may employ multiple access networks in a geographic area, with each access network operating according to a different wireless protocol. For example, in a given geographic area, a wireless carrier may employ one access network operating according to EIA/TIA/IS-856 Rel. 0, Rev. A, or other versions thereof (hereafter "IS-856") and another access network operating according to EIA/TIA/IS-2000 Rel. 0, Rel. A, or other versions thereof (hereafter "IS-2000"). In such a geographic area, a subscriber may then use a dual-mode or "hybrid" access terminal that is capable of receiving service from—and switching between—the different access networks. To enable this ability, a hybrid access terminal may be capable of performing scheduled "tuneaways" during which it temporarily tunes away from one access network and to the other access network, such that hybrid access terminal can receive page messages and other control-channel messages from the other access network. If the hybrid access terminal receives a page message during one such tuneaway, the hybrid access terminal may then remain tuned to that access network and begin an active communication with the access network.

OVERVIEW

An access network operating according to a protocol such as IS-856 or IS-2000 may assign an access terminal particular cycles or timeslots of a wireless link (or a channel thereof) during which the access network will send control-channel data on the wireless link intended for the access terminal. According to one tuneaway scheme, a hybrid access terminal configured to receive service from two such access networks may request different cycle/timeslot assignments from one or both of the access networks, to ensure that the hybrid access terminal's assigned cycles/timeslots for the two different access networks do not overlap. Such a tuneaway scheme is one manner in which the hybrid access terminal attempts to ensure that it is available to perform scheduled tuneaways from a first access network to a second access network during the hybrid access terminal's assigned cycles/timeslots for the second access network.

Even when the hybrid access terminal's assigned cycles/timeslots for the two different access networks do not overlap, however, there may be times when the hybrid access terminal cannot perform a scheduled tuneaway from the first access network to the second access network. For instance, there may be times when the first access network has a large amount of control-channel data to send during one of the hybrid access terminal's assigned cycle/timeslots, such that the transmission of that control-channel data will exceed the hybrid access terminal's assigned cycle/timeslot and extend into a subsequent cycle/timeslot. As a result, the hybrid access terminal will need to remain tuned to the first access network during the subsequent cycle/timeslot in order to receive all of the control-channel data. If this subsequent cycle/timeslot for the first access network overlaps with one of the hybrid access terminal's assigned cycle/timeslot for the second access network, however, the hybrid access terminal may miss a tuneaway from the first access network to the second access network. As the extent of these missed tuneaways increases, the hybrid access terminal may begin missing incoming communications and/or other important information from the access network. Accordingly, a method of avoiding these missed tuneaways is desired.

Disclosed herein is such a method. According to an exemplary method, one or more of a group of hybrid access terminals assigned to the same given cycles/timeslots of a first wireless link provided by the first access network may send the first access network one or more reports of one or more missed tuneaways from the first wireless link to a second wireless link provided by the second access network. Based on the one or more reports, the first access network may then determine that the group of hybrid access terminals (or a given one of the group of hybrid access terminals) has missed a threshold extent of tuneaways from the first wireless link to the second wireless link. In response to this determination, the first access network may decide to reduce the amount of control-channel data to send on the first wireless link during the given cycles/timeslots of the first wireless link assigned to the group of hybrid access terminals. The first access network may then begin sending a reduced amount of control-channel data on the first wireless link during the given cycles/timeslots of the first wireless link assigned to the group of hybrid access terminals. This reduction in control-channel data may significantly decrease the occurrence of missed tuneaways caused by large quantities of control-channel data.

A first embodiment of the exemplary method may include (a) receiving at an access network providing a first wireless link configured according to a first protocol (e.g., IS-856), from one or more of a group of hybrid access terminals assigned to the same given control-channel cycles of the first wireless link, one or more reports of one or more missed tuneaways from the first wireless link to a second wireless link configured according to a second protocol (e.g., IS-2000), (b) based on the received one or more reports, determining that the group of hybrid access terminals has missed a threshold extent of tuneaways from the first wireless link to the second wireless link, (c) in response to determining that the group of hybrid access terminals has missed the threshold extent of tuneaways, deciding to reduce an amount of control-channel data to send on the first wireless link during the given control-channel cycles and then beginning to send a reduced amount of control-channel data on the first wireless link during the given control-channel cycles.

The feature of receiving the one or more reports of the one or more missed tuneaways may take various forms. In one example, this feature may include receiving a separate report indicating the occurrence of each tuneaway missed by one of the group of hybrid access terminals. In another example, this feature may include receiving a report indicating the occurrence of a threshold extent of tuneaways missed by one of the group of hybrid access terminals. Other examples are possible as well. The received one or more reports may also each include an indication of a reason for the one or more missed tuneaways.

Further, the feature of determining that the group of hybrid access terminals has missed a threshold extent of tuneaways may take various forms. In one example, this feature may include (a) determining a number of hybrid access terminals in the group of hybrid access terminals that have missed a tuneaway within a given time period, (b) calculating a ratio between the determined number and a total number of hybrid access terminals in the group of hybrid access terminals, and (c) determining that the calculated ration exceeds a threshold. In another example, this feature may include calculating a number of tuneaways missed by the group of hybrid access terminals within a given time period and then determining that the calculated number exceeds a threshold. In yet another example, this feature may include determining that one given hybrid access terminal in the group of hybrid access terminals has missed a threshold extent of tuneaways. Other examples are possible as well. The access network may perform this determination based on tuneaways missed for all reasons, or only tuneaways missed for one or more particular reasons (e.g., tuneaways missed as a result of being occupied with receiving control-channel data on the first wireless link).

Further yet, the feature of deciding to reduce an amount of control-channel data to send on the first wireless link during the given control-channel cycles may take various forms. In one example, this feature may include deciding to impose a cap on the amount of control-channel data to send on the first wireless link during the given control-channel cycles. In another example, this feature may include deciding to impose a cap on the size of one or more types of control-channel messages to send on the first wireless link during the given control-channel cycles, such as by deciding to impose a cap on the size of a neighbor list included in an IS-856 SectorParameters message. In yet another example, this feature may include removing a coverage area served by the first wireless link from one or more paging areas, such as by (1) identifying a paging area that includes the coverage area served by the first wireless link, (2) calculating a relative distance between a reference location of the coverage area served by the first wireless link and a reference location of the identified paging area, (3) comparing the relative distance to a threshold distance value and thereby determining that the relative distance exceeds the threshold value, and (4) in response determining that the relative distance exceeds the threshold value, removing the coverage area served by the first wireless link from the identified paging area. Other examples are possible as well.

The first embodiment of the exemplary method may also include additional features. For example, the first embodiment of the exemplary method may additionally include (e) deciding to increase an amount of control-channel data to send on the first wireless link during the given control cycles back to a full amount, and (f) in response to deciding to increase the amount back to a full amount, beginning to send a full amount of control-channel data on the first wireless link during the given control-channel cycles. Other examples are possible as well.

A second embodiment of the exemplary method may include a hybrid access terminal (a) receiving from an access network, on a first wireless link configured according to a first protocol, a full amount of control-channel data during given control-channel cycles of the first wireless link assigned to the hybrid access terminal, (b) detecting one or more missed tuneaways from the first wireless link to a second wireless link configured according to a second protocol, (c) sending to the access network one or more reports of one or more missed tuneaways from the first wireless link to the second wireless link, wherein the one or more missed-tuneaway reports indicate that the hybrid access terminal has missed a threshold extent of tuneaways, and (d) as a result of sending the one or more reports, receiving from the access network, on the first wireless link, a reduced amount of control-channel data during the given control-channel cycles of the first wireless link.

The feature of detecting the one or more missed tuneaways may take various forms. In one example, this feature may include identifying a reason for each of the one or more missed tuneaways. Other examples are possible as well.

The feature of sending the one or more reports of the one or more missed tuneaways may also take various forms. In one example, this feature may include sending a separate report indicating the occurrence of each missed tuneaway. In another example, this feature may include sending a given report indicating the occurrence of a threshold extent of missed tuneaways by the hybrid access terminal, in which case the second embodiment of the exemplary method may additionally include a feature of determining whether the hybrid access terminal has missed a threshold extent of tuneaways. Other examples are possible as well.

Also disclosed herein is a base transceiver station (BTS) that includes (a) a wireless communication interface configured to provide at least a first wireless link configured according to a first protocol, (b) a radio network controller (RNC) communication interface configured to provide connectivity with an RNC, (c) a processor, (d) data storage, and (e) program instructions stored in data storage and executable by the processor to carry out the features described herein.

These as well as other aspects and advantages will become apparent to those of ordinary skill in the art by reading the following detailed description, with reference where appropriate to the accompanying drawings.

DETAILED DESCRIPTION

I. Communications System

Figure 1:
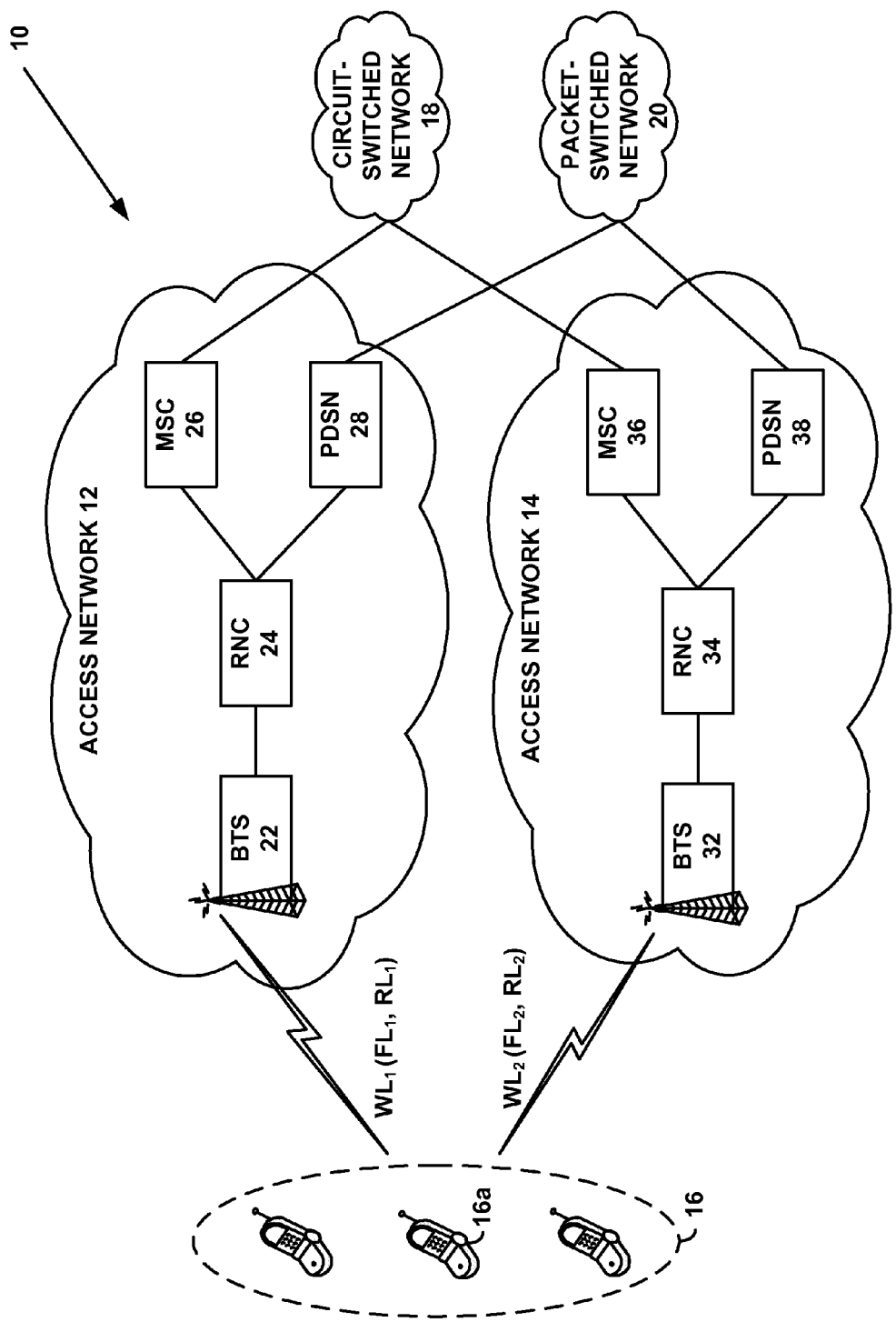
FIG. 1 is a simplified block diagram of a communication system in which an exemplary method can be implemented.

Referring to the drawings, FIG. 1 is a simplified block diagram of a communications system 10 in which an exemplary method can be implemented. As shown, the system 10 may include multiple access networks operating according to different wireless protocols, such as a first access network 12 and a second access network 14. Each access network may function to provide connectivity between one or more access terminals, such as a group of hybrid access terminals 16 that includes hybrid access terminal 16a, and one or more transport networks, such as a circuit-switched network 18 (e.g., the public switched telephone network (PSTN)) and a packet-switched network 20 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, each access network may include at least one base transceiver station (BTS), such as BTS 22 in access network 12 and BTS 32 in access network 14. (Although FIG. 1 depicts each access network as including one BTS, it should be understood that each access network may include a plurality of BTSs.) Each BTS may be any entity that facilitates wireless communication between an access network and one or more access terminals, such as hybrid access terminal 16a. In this respect, each BTS may radiate to define one or more wireless coverage areas, such as a cell and/or cell sectors. Within each of its coverage areas, each BTS may provide at least one wireless link on a respective carrier frequency, such as wireless link $WL_1$ provided by BTS 22 and wireless link $WL_2$ provided by BTS 32, over which the group of hybrid access terminals 16 may communicate with the BTS. (As used herein, the term "carrier frequency" may include a single carrier frequency or a set of carrier frequencies). Each BTS may also function to control aspects of wireless communication with the group of hybrid access terminals 16.

Each wireless link may carry communications between its access network and the group of hybrid access terminals 16 according to any of a variety of protocols, including IS-2000, IS-856, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Each wireless link may also be divided into a forward link for carrying communications from the access network to the group of hybrid access terminals 16 and a reverse link for carrying communications from the group of hybrid access terminals 16 to the access network. In turn, each forward link and each reverse link may be divided into a plurality of channels using any mechanism now known or later developed, including code division multiplexing, time division multiplexing, and/or frequency division multiplexing for instance.

For purposes of illustration, the embodiments herein will be described by way of example with wireless link $WL_1$ access network 12 configured according to an IS-856 protocol (also known as EV-DO) and wireless link $WL_2$ provided by access network 14 configured according to according to an IS-2000 protocol (also known as 1xRTT). It should be understood, however, that the techniques described herein may apply to tuneaways between wireless links configured according to various other protocols as well.

According to IS-856, wireless link $WL_1$ may be identified by its carrier frequency and a unique pseudonoise offset ("PN offset") that distinguishes IS-856 wireless link $WL_1$ from other wireless links provided by BTS 22. IS-856 wireless link $WL_1$ may include an IS-856 forward link $FL_1$ that is time-division multiplexed into timeslots with a length of 2048 chips and duration of approximately 1.67 milliseconds (ms). In turn, each such forward-link timeslot may be further time-division multiplexed into various forward channels for carrying communications from access network 12 to the group of hybrid access terminals 16. For example, a forward-link timeslot may be divided into two 1024-chip half-slots, each arranged to carry a 96-chip forward pilot channel, two 64-chip forward medium access control (MAC) channel segments, and two 400-chip forward data segments allocated for either a forward control channel or a forward traffic channel. IS-856 wireless link $WL_1$ may also include an IS-856 reverse link $RL_1$ that is code division multiplexed via Walsh codes into various reverse channels for carrying communications from the group of hybrid access terminals 16 to access network 12, such as a reverse access channel, reverse pilot channels, and reverse traffic channels.

According to IS-2000, wireless link $WL_2$ may be identified by its carrier frequency and a unique PN offset that distinguishes IS-2000 wireless link $WL_2$ from other wireless links provided by BTS 32. IS-2000 wireless link $WL_2$ may include an IS-2000 forward link $FL_2$ that is code division multiplexed via Walsh codes into various forward channels for carrying communications from access network 14 to the group of hybrid access terminals 16, such as a forward pilot channel, a forward sync channel, forward control channels (e.g., one or more forward paging channels, one or more forward common control channels, and/or a forward broadcast control channel), and one or more forward traffic channels. Similarly, IS-2000 wireless link $WL_2$ may include an IS-2000 reverse link $RL_2$ that is code division multiplexed via Walsh codes into various reverse channels for carrying communications from the group of hybrid access terminals 16 to access network 14, such as a reverse access channel, one or more reverse pilot channels, and one or more reverse traffic channels.

As further shown in FIG. 1, each BTS may couple to a radio network controller (RNC), such as RNC 24 in access network 12 and RNC 34 in access network 14. (Although FIG. 1 depicts each access network as including one RNC, it should be understood that each access network may include more than one RNC, in which case each RNC may couple to a subset of the BTSs in each access network. Further, although the BTSs and RNCs are depicted as separate entities, it should be understood that these entities may be integrated together and referred to as an "access node.") Each RNC may function to communicate with its coupled BTS(s) and control aspects of wireless communication with the group of hybrid access terminals 16. Each RNC may also provide connectivity with one or more transport networks via one or more switches or gateways. For example, as shown, RNC 24 may couple to circuit-switched network 18 via mobile switching center (MSC) 26 and packet-switched network 20 via packet data serving node (PDSN) 28. Similarly, as shown, RNC 34 may couple to circuit-switched network 18 via MSC 36 and packet-switched network 20 via PDSN 38. Other examples are possible as well.

For purposes of illustration, FIG. 1 depicts access networks 12 and 14 as physically separate arrangements to emphasize that they operate according to different wireless protocols. It should be understood, however, that in practice access networks 12 and 14 may be physically co-located in an overlay arrangement. For instance, access networks 12 and 14 may share common BTSs, each with shared or separate channel cards/units and associated logic for each wireless protocol (e.g., IS-856 circuit cards to facilitate IS-856 operation and IS-2000 circuit cards to facilitate IS-2000 operation). Alternatively, access networks 12 and 14 may have respective BTSs but share common RNCs, MSCs, and/or PSDNs. Other examples are possible as well, and the specific details of the access network arrangements and their physical relationship with each other are not critical to the embodiments described herein.

Each hybrid access terminal in hybrid-access-terminal group 16 may be any device capable of receiving wireless service from multiple access networks operating according to different protocols, such as access network 12 operating according to IS-856 and access network 14 operating according to IS-2000. (Although FIG. 1 depicts hybrid-access-terminal group 16 as including three hybrid access terminals, it should be understood that hybrid-access-terminal group 16 may include any number of hybrid access terminals.) By way of example only, each hybrid access terminal in hybrid-access-terminal group 16 may take the form of a cellular telephone, a computer (e.g., a desktop, laptop, tablet, netbook, etc.), a personal digital assistant (PDA), or a personal navigation device (PND). Other examples are possible as well.

II. Example IS-856/IS-2000 Hybrid Operation a. IS-856 Control Channel

Figures 2A, 2B:
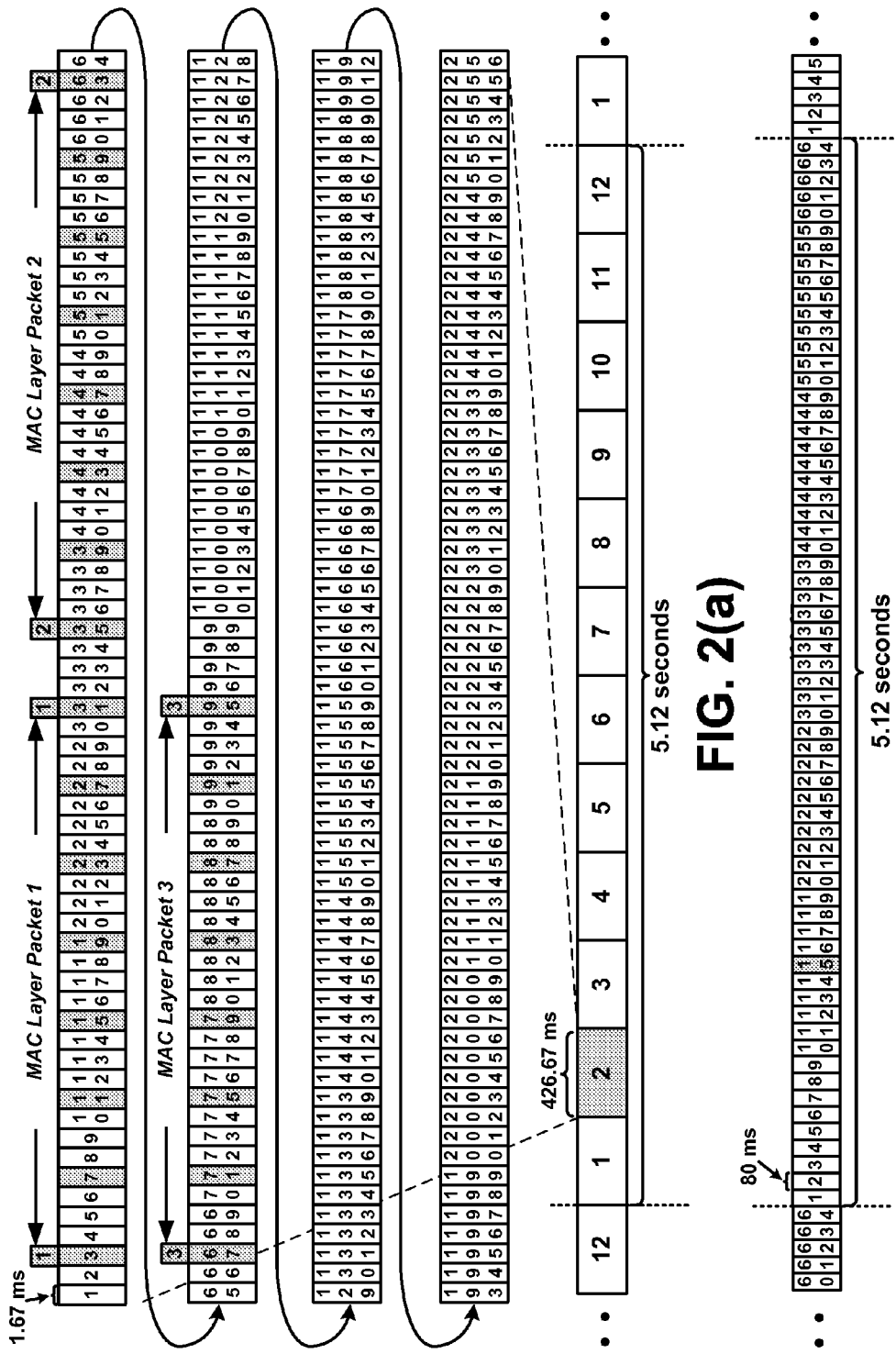
FIG. 2(a) illustrates an arrangement of an exemplary IS-856 control channel.
FIG. 2(b) illustrates an arrangement of an exemplary IS-2000 paging channel.

According to IS-856, a forward link may be arranged into repeating periods of timeslots known as "control-channel periods," and each such control-channel period may be further arranged into groups of timeslots known as "control-channel cycles." For example, as shown in FIG. 2(a), an IS-856 forward link may be arranged into a series of repeating control-channel periods, each having 12 control-channel cycles. Further, as shown in FIG. 2(a), each control-channel cycle may include 256 timeslots of duration 1.67 ms, for a total of 426.67 ms. As such, each control-channel cycle may include 3072 timeslots of duration 1.67 ms, for a total of 5.12 seconds. An IS-856 forward link may take other forms as well.

In the example communication system 10 described with reference to FIG. 1, access network 12 may assign each control-channel cycle of each control-channel period of IS-856 forward link $FL_1$ to a different group of access terminals being served by IS-856 wireless link $WL_1$. For example, access network 12 may assign the $2^{nd}$ control-channel cycle of each control-channel period of IS-856 forward link $FL_1$ to hybrid-access-terminal group 16. Access network 12 may then send control-channel messages intended for any hybrid access terminal in hybrid-access-terminal group 16 on IS-856 forward link $FL_1$ only during the control-channel cycle of each control-channel period assigned to hybrid-access-terminal group 16. In turn, any idle access terminal in hybrid-access-terminal group 16 may monitor IS-856 forward link $FL_1$ for control-channel messages only during the control-channel cycle of each control-channel period assigned to hybrid-access-terminal group 16, thus enabling those idle access terminals to conserve power during all other control-channel cycles.

Access network 12 may transmit the control-channel messages intended for hybrid access terminals in hybrid-access-terminal group 16 on IS-856 forward link $FL_1$ in various manners. In one example, during each control-channel cycle assigned to hybrid-access-terminal group 16, access network 12 may transmit a synchronous capsule that includes various synchronous control channel-messages intended for hybrid access terminals in hybrid-access-terminal group 16. For instance, the synchronous capsule may include overhead messages (e.g., Sync, QuickConfig, SectorParameters, AccessParameters, BroadcastReverseRateLimit, etc.) and/or page messages intended for hybrid access terminals in hybrid-access-terminal group 16. Other examples are possible as well. The synchronous capsule may take the form of one or more MAC layer packets (e.g., 3 in FIG. 2(a)), each occupying a given number of timeslots (e.g., 8 timeslots for a data rate of 76.8 kbps as in FIG. 2(a) or 16 timeslots for a data rate of 38.4 kbps) and holding a given amount of synchronous control-channel data (e.g., up to 992 bits). Access network 12 may begin transmission of the first MAC layer packet of the synchronous capsule after a given number of timeslots from the start of the control-channel cycle (e.g., 2 timeslots in FIG. 2(a)) and then continue transmission of the one or more MAC layer packets of the synchronous capsule using timeslot interlacing (e.g., 4-timeslot interlacing in FIG. 2(a)) until all synchronous control-channel messages intended for the given group of access terminals have been sent.

As another example, during the control-channel cycle of each control-channel period assigned to hybrid-access-terminal group 16, access network 12 may transmit an asynchronous capsule that includes various asynchronous control-channel messages intended for hybrid access terminals in hybrid-access-terminal group 16. For instance, the asynchronous capsule may include channel assignment messages. Other examples are possible as well. The asynchronous capsule may take the form of one MAC layer packet occupying a given number of timeslots (e.g., 8 timeslots for a data rate of 76.8 kbps or 16 timeslots for a data rate of 38.4 kbps) and carrying a given amount of asynchronous control-channel data (e.g., up to 992 bits). Access network 12 may begin transmission of this asynchronous capsule during any timeslot other than the timeslots designated for the synchronous capsule, and then continue transmission of the asynchronous capsule using timeslot interlacing (e.g., 4-timeslot interlacing) until all asynchronous control-channel messages intended for the given group of access terminals have been sent.

b. IS-2000 Paging Channel

According to IS-2000, a forward link may include one or more forward paging channels that are each arranged into repeating periods of timeslots known as "slot cycles." For example, as shown in FIG. 2(*b*), an IS-2000 forward link may include a paging channel arranged into a series of repeating slot cycles each having 64 timeslots of duration 80 ms, for a total of 5.12 seconds. As another example, an IS-2000 forward link may include a paging channel arranged into a series of repeating slot cycles each having 32 timeslots of duration 80 ms, for a total of 2.56 seconds. An IS-2000 forward link may take other forms as well.

In the example communication system 10 described with reference to FIG. 1, access network 14 may assign each timeslot of each slot cycle on a paging channel of IS-2000 forward link $FL_2$ to a different group of access terminals being served by IS-2000 wireless link $WL_2$. For example, access network 14 may assign the $15^{th}$ timeslot of each 32-timeslot slot cycle on IS-2000 forward link $FL_2$ to hybrid-access-terminal group 16. Access network 12 may then send control-channel messages intended for hybrid access terminals in hybrid-access-terminal group 16 on the paging channel of IS-2000 forward link $FL_2$ only during the timeslot of each slot cycle assigned to hybrid-access-terminal group 16. In turn, any idle access terminals in hybrid-access-terminal group 16 may only monitor the paging channel of IS-2000 forward link $FL_2$ for control-channel messages during the timeslot of each slot cycle assigned to hybrid-access-terminal group 16, thus enabling those idle access terminals to conserve power during all other timeslots.

c. Tuneaways

As noted above, to facilitate the ability to receive control-channel data on wireless links configured according to different protocols, a hybrid access terminal may be configured to perform scheduled "tuneaways" during which it temporarily tunes away from a first wireless link configured according to a first protocol and to a second wireless link configured according to the second protocol. Preferably, such tuneaways will be scheduled to coincide with the hybrid access terminal's assigned cycle or timeslot on a control channel of the second wireless link.

In the example communication system 10 described with reference to FIG. 1, each hybrid access terminal in hybrid-access-terminal group 16 may be configured to perform scheduled tuneaways during which it temporarily tunes away from a wireless link provided by one of access networks 12 and 14 to a wireless link provided by the other of access networks 12 and 14. For purposes of illustration, the embodiments herein will be described by way of example with reference to hybrid access terminals in hybrid-access-terminal group 16 performing tuneaways from IS-856 wireless link $WL_1$ provided by access network 12 to IS-2000 wireless link $WL_2$ provided by access network 14. It should be understood, however, that hybrid access terminals in hybrid-access-terminal group 16 may perform similar tuneaways from IS-2000 wireless link $WL_2$ to IS-856 wireless link $WL_1$, or between any other wireless links configured according to different protocols.

In one example, hybrid access terminal 16*a* may initially be tuned to IS-856 wireless link $WL_1$ and operational in an idle state during which it monitors IS-856 forward link $FL_1$ only during its assigned IS-856 control-channel cycles. Shortly before its next assigned IS-2000 paging-channel timeslot, hybrid access terminal 16*a* may then tune away from IS-856 wireless link $WL_1$ and to IS-2000 wireless link $WL_2$. In turn, hybrid access terminal 16*a* may monitor a paging channel of IS-2000 forward link $FL_2$ during its assigned IS-2000 paging-channel timeslot and thereby receive any relevant control-channel messages sent by access network 14. If these control-channel messages include an IS-2000 page message intended for hybrid access terminal 16*a*, then hybrid access terminal 16*a* may remain tuned to IS-2000 wireless link $WL_2$ and engage in an active communication with access network 14. Otherwise, shortly after the hybrid access terminal's assigned IS-2000 paging-channel timeslot, hybrid access terminal 16*a* may tune away from IS-2000 wireless link $WL_2$ and back to IS-856 wireless link $WL_1$. Hybrid access terminal 16*a* may continue this process for the time period during which it is powered on and located in overlapping coverage areas served by wireless links $WL_1$ and $WL_2$.

According to an IS-856/IS-2000 tuneaway scheme, hybrid access terminal 16*a* may request a different IS-856 control-channel cycle assignment from access network 12 and/or a different IS-2000 paging-channel timeslot assignment from access network 14 to ensure that its assigned IS-856 control-channel cycles do not overlap with its assigned IS-2000 paging-channel timeslots. Such an IS-856/IS-2000 tuneaway scheme is one manner in which hybrid access terminal 16*a* may attempt to ensure that it is available to perform scheduled tuneaways from IS-856 wireless link $WL_1$ to IS-2000 wireless link $WL_2$ during its assigned IS-2000 paging-channel timeslots. Even when the hybrid access terminal's assigned IS-856 control-channel cycles and assigned IS-2000 paging-channel timeslots do not overlap, however, there may be times when hybrid access terminal 16*a* cannot perform a scheduled tuneaway from IS-856 wireless link $WL_1$ to IS-2000 wireless link $WL_2$. For instance, there may be times when access network 12 has a large amount of synchronous control-channel data to send during a given IS-856 control-channel cycle assigned to hybrid-access-terminal group 16, such that the transmission of a synchronous capsule containing that synchronous control-channel data will exceed the given IS-856 control-channel cycle and extend into a subsequent IS-856 control-channel cycle. As a result, the hybrid access terminals in hybrid-access-terminal group 16 will need to continue monitoring IS-856 forward link $FL_1$ during the subsequent IS-856 control-channel cycle in order to receive the entire synchronous capsule. If this IS-856 subsequent control-channel cycle overlaps with IS-2000 paging-channel timeslots assigned to any hybrid access terminal in hybrid-access-terminal group 16, however, those hybrid access terminals may miss a tuneaway from IS-856 wireless link $WL_1$ to IS-2000 wireless link $WL_2$.

During times of heavy congestion on IS-856 wireless link $WL_1$ and/or other IS-856 wireless links provided by access network 12, the amount of synchronous control-channel data that needs to be sent by access network 12—and thus the extent of missed tuneaways caused by oversized synchronous capsules—may increase. As a result, hybrid access terminals such as those in hybrid-access-terminal group 16 may begin missing incoming IS-2000 communications and/or other important information from access network 14. Accordingly, as noted above, a method of avoiding these missed tuneaways is desired.

III. Exemplary Method

Disclosed herein is an exemplary method of avoiding missed tuneaways from a first wireless link provided by a first access network and configured according to a first protocol to a second wireless link provided by a second access network and configured according to a second protocol. According to the exemplary method, a group of hybrid access terminals assigned to the same given cycles/timeslots of the first wireless link may send the first access network one or more reports of one or more missed tuneaways from the first wireless link to the second wireless link. Based on the one or more reports, the access network may then determine that the group of hybrid access terminals (or a given one of the group of hybrid access terminals) has missed a threshold extent of tuneaways from the first wireless link to the second wireless link. In response to this determination, the access network may decide to reduce the amount of control-channel data to send on the first wireless link during the given cycles/timeslots the first wireless link assigned to the group of hybrid access terminals. The access network may then begin sending a reduced amount of control-channel data on the first wireless link during the given cycle/timeslots of the first wireless link assigned to the group of hybrid access terminals. This reduction in control-channel data may significantly decrease the occurrence of missed tuneaways caused by oversized synchronous capsules.

Figure 3:
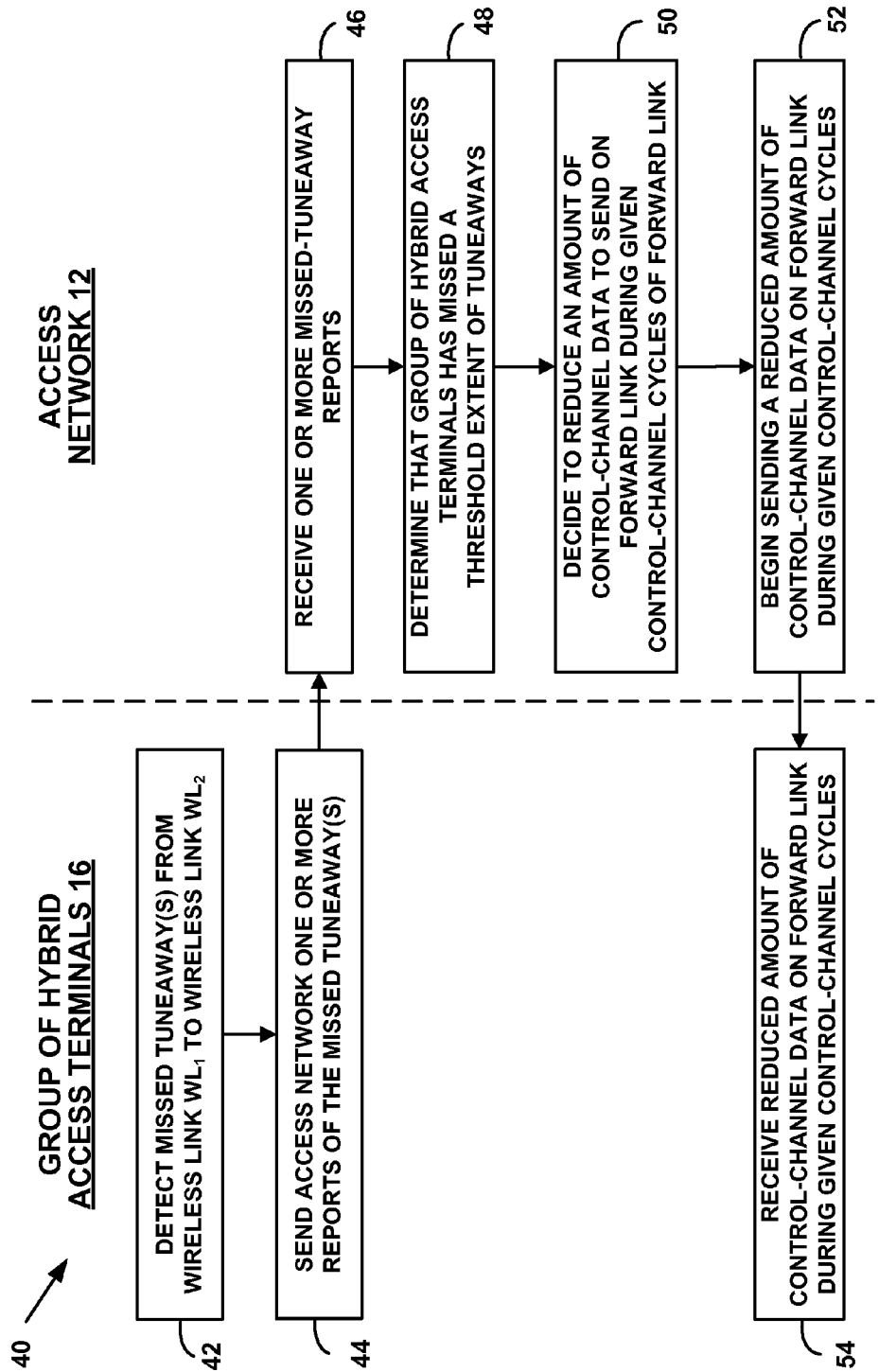
FIG. 3 is a simplified flow chart depicting an exemplary method of avoiding missed tuneaways from a first wireless link configured according to a first protocol to a second wireless link configured according to a second protocol.

FIG. 3 is a flow chart depicting an exemplary method 40 of avoiding missed tuneaways from a first wireless link configured according to a first protocol to a second wireless link configured according to a second protocol. For purposes of illustration, exemplary method 40 will be described with reference to hybrid access terminals in hybrid-access-terminal group 16 performing tuneaways from IS-856 wireless link $WL_1$ provided by access network 12 to IS-2000 wireless link $WL_2$ provided by access network 14. Further, for purposes of illustration, the following description will assume that hybrid-access-terminal group 16 comprises the entire group of hybrid access terminals assigned to a given control-channel cycle of each control-channel period of IS-856 wireless link $WL_1$ (e.g., the $2^{nd}$ control-channel cycle of each control-channel period). It should be understood, however, that exemplary method 40 may be applicable to any configuration in which a device performs tuneaways between wireless links of different protocols.

As shown in FIG. 3, exemplary method 40 begins at step 42 with one or more hybrid access terminals in hybrid-access-terminal group 16 detecting one or more missed tuneaways from IS-856 wireless link $WL_1$ to IS-2000 wireless link $WL_2$. For example, hybrid access terminal 16a may detect that one of its assigned IS-2000 paging-channel timeslots—and thus a time during which hybrid access terminal 16a was scheduled to perform the tuneaway—occurred while hybrid access terminal 16a was occupied with receiving a synchronous capsule on IS-856 forward link FL'. Other examples are possible as well. While detecting each missed tuneaway, a hybrid access terminal in hybrid-access-terminal group 16 may also identify a reason for the missed tuneaway (e.g., occupied with receiving a synchronous capsule on IS-856 forward link $FL_1$).

After detecting each missed tuneaway, a hybrid access terminal in hybrid-access-terminal group 16 may optionally determine whether it has missed a threshold extent of tuneaways from IS-856 wireless link $WL_1$ to IS-2000 wireless link $WL_2$. For example, hybrid access terminal 16a may determine whether it has missed a threshold number of tuneaways within a given time period (e.g., 2 missed tuneaways within the previous 15.36 seconds). Other examples are possible as well. A hybrid access terminal in hybrid-access-terminal group 16 may perform this determination based on all missed tuneaways, or only tuneaways missed for one or more particular reasons.

At step 44, the one or more hybrid access terminals in hybrid-access-terminal group 16 may send access network 12 one or more reports of the detected one or more missed tuneaways from IS-856 wireless link $WL_1$ to IS-2000 wireless link $WL_2$. For example, hybrid access terminal 16a may send access network 12 a separate report indicating the occurrence of each tuneaway missed by hybrid access terminal 16a. In another example, hybrid access terminal 16a may send access network 12 a report indicating the occurrence of a threshold extent of tuneaways missed by hybrid access terminal 16a. In either case, the report may also include an indication of a reason for the one or more missed tuneaways (e.g., occupied with receiving a synchronous capsule on IS-856 forward link $FL_1$). Other examples are possible as well. The one or more hybrid access terminals in hybrid-access-terminal group 16 may each send access network 12 the one or more missed-tuneaway reports on a reverse access channel (or some other reverse channel) of IS-856 reverse link $RL_1$. Other examples are possible as well.

At step 46, as a result of the one or more hybrid access terminals in hybrid-access-terminal group 16 sending the one or more missed-tuneaway reports, access network 12 may receive the one or more missed-tuneaway reports. For example, access network 12 may receive a separate report indicating the occurrence of each tuneaway missed by hybrid access terminal 16a (and/or any other hybrid access terminal in hybrid-access-terminal group 16). As another example, access network 12 may receive a report indicating the occurrence of a threshold extent of tuneaways missed by hybrid access terminal 16a (and/or any other hybrid access terminal in hybrid-access-terminal group 16). Other examples are possible as well.

At step 48, based on the received one or more missed-tuneaway reports, access network 12 may then determine that hybrid-access-terminal group 16 has missed a threshold extent of tuneaways from IS-856 wireless link $WL_1$ to IS-2000 wireless link $WL_2$. This determination may take various forms, which may be implemented separately or together.

In one aspect of exemplary method 40, based on the received one or more missed-tuneaway reports, access network 12 may determine a number of hybrid access terminals in hybrid-access-terminal group 16 that have missed a tuneaway within a given time period (e.g., the previous 15.36 seconds). In turn, access network 12 may calculate a ratio between the determined number and the total number of hybrid access terminals in hybrid-access-terminal group 16 (i.e., the total number of hybrid access terminals assigned to the given control-channel cycle of IS-856 wireless link $WL_1$) and compare the calculated ration to a ratio threshold (e.g., 25-30%). Based on this comparison, access network 12 determine that the calculated ratio exceeds the ratio threshold and thus that hybrid-access-terminal group 16 has missed a threshold extent of tuneaways from IS-856 wireless link $WL_1$ to IS-2000 wireless link $WL_2$.

In another aspect of exemplary method 40, based on the received one or more missed-tuneaway reports, access network 12 may calculate a number of tuneaways missed by hybrid access terminals in hybrid-access-terminal group 16 within a given time period (e.g., the previous 15.36 seconds). In turn, access network 12 may compare the calculated number to a missed-tuneaway threshold, which may either be static (e.g., 5 missed tuneaways) or dependent upon the total number of hybrid access terminals in hybrid-access-terminal group 16 (e.g., 1 missed tuneaway per 4 hybrid access terminals in hybrid-access-terminal group 16). Based on this comparison, access network 12 may determine that the calculated number exceeds the threshold and thus that hybrid-access-terminal group 16 has missed a threshold extent of tuneaways from IS-856 wireless link $WL_1$ to IS-2000 wireless link $WL_2$.

In yet another aspect of exemplary method 40, based on the received one or more missed-tuneaway reports, access network 12 may first identify which hybrid access terminals in hybrid-access-terminal group 16 have individually missed a threshold extent of tuneaways. For example, if access terminal 12 receives a separate report indicating the occurrence of each missed tuneaway by hybrid access terminal 16a, access network 12 may perform the identification by (a) calculating a number of missed-tuneaway reports received from—and thus a number of tuneaways missed by—hybrid access terminal 16a within a given time period (e.g., the previous 15.36 seconds) and (b) determining that the calculated number exceeds a missed-tuneaways threshold (e.g., 2). In another example, if access terminal 12 receives a report indicating the occurrence of a threshold extent of tuneaways missed by hybrid access terminal 16a, access network 12 may perform the identification by determining that it has received such a report from hybrid access terminal 16a within a given time period (e.g., the previous 15.36 seconds). Other examples are possible as well.

After identifying which hybrid access terminals in hybrid-access-terminal group 16 have individually missed a threshold extent of tuneaways, access network 12 may use this identification to determine that hybrid-access-terminal group 16 has missed a threshold extent of tuneaways from IS-856 wireless link $WL_1$ to IS-2000 wireless link $WL_2$. In one example, access network 12 may calculate a ratio between (a) the number of identified hybrid access terminals in hybrid-access-terminal group 16 that have individually missed a threshold extent of tuneaways and (b) the total number of hybrid access terminals in hybrid-access-terminal group 16 (i.e., the total number of hybrid access terminals assigned to the given control-channel cycle of IS-856 wireless link $WL_1$). Access network 12 may then determine that the calculated ratio exceeds a ratio threshold (e.g., 25-30%), and thus that hybrid-access-terminal group 16 has missed a threshold extent of tuneaways from IS-856 wireless link $WL_1$ to IS-2000 wireless link $WL_2$.

In another example, access network 12 may compare the number of identified hybrid access terminals in hybrid-access-terminal group 16 that have individually missed a threshold extent of tuneaways to a threshold number of hybrid access terminals. Based on this comparison, access network 12 may determine that the number of identified hybrid access terminals exceeds the threshold number and thus that hybrid-access-terminal group 16 has missed a threshold extent of tuneaways from IS-856 wireless link $WL_1$ to IS-2000 wireless link $WL_2$. According to one implementation of this example, access network 12 may set the threshold number of hybrid access terminals to zero, in which case access network 12 will determine that hybrid-access-terminal group 16 has missed a threshold extent of tuneaways if access terminal 12 identifies any one hybrid access terminal in hybrid-access-terminal group 16 that has missed a threshold extent of tuneaways from IS-856 wireless link $WL_1$ to IS-2000 wireless link $WL_2$.

Access network 12 may perform any of the above determinations based on tuneaways missed for all reasons, or only tuneaways missed for one or more particular reasons. For example, access network 12 may perform any of the above determinations based only on tuneaways missed as a result of hybrid access terminals being occupied with receiving synchronous capsule on IS-856 forward link FL'. Other examples are possible as well. Access network 12 may determine that hybrid-access-terminal group 16 has missed a threshold extent of tuneaways from IS-856 wireless link $WL_1$ to IS-2000 wireless link $WL_2$ in other manners as well.

At step 50, in response to determining that hybrid-access-terminal group 16 has missed a threshold extent of tuneaways from IS-856 wireless link $WL_1$ to IS-2000 wireless link $WL_2$, access network 12 may decide to reduce an amount of control-channel data to send on IS-856 forward link $FL_1$ during the given control-channel cycles of IS-856 forward link $FL_1$ assigned to hybrid-access-terminal group 16. This decision may take various forms, which may be implemented separately or together.

In one aspect of exemplary method 40, in response to determining that hybrid-access-terminal group 16 has missed a threshold extent of tuneaways, access network 12 may decide to impose a cap on the amount of control-channel data to send on IS-856 forward link $FL_1$ during the given control-channel cycles of IS-856 forward link $FL_1$ assigned to hybrid-access-terminal group 16. For instance, access network 12 may decide to impose a cap on the maximum amount of synchronous control-channel data to send in a synchronous capsule on IS-856 forward link $FL_1$ during the given control-channel cycles of IS-856 forward link $FL_1$ assigned to hybrid-access-terminal group 16. As one example, this synchronous control-channel data cap may be equal to the number of MAC layer packets that can be transmitted during an IS-856 control-channel cycle (e.g., assuming 4-timeslot interlacing, 8 MAC layer packets for a data rate of 76.8 kbps or 4 MAC layer packets for a data rate of 38.4 kbps) multiplied by the maximum amount of synchronous control-channel data that each MAC layer packet can hold (e.g., 992 bits). The synchronous control-channel data cap may take other forms as well. As a result of deciding to impose a cap on the maximum amount of control-channel data to send on IS-856 forward link $FL_1$ during the given control-channel cycles of IS-856 forward link $FL_1$ assigned to hybrid-access-terminal group 16, some control-channel messages (e.g., IS-856 page messages) may end up being transmitted during later IS-856 control-cycle periods.

In another aspect of exemplary method 40, in response to determining that hybrid-access-terminal group 16 has missed a threshold extent of tuneaways, access network 12 may impose a cap on the size of one or more control-channel message types to send on IS-856 forward link $FL_1$ during the given control-channel cycles of IS-856 forward link $FL_1$ assigned to hybrid-access-terminal group 16. For instance, access network 12 may impose a cap on the size of a Sector-Parameters control-channel message to send on IS-856 forward link $FL_1$ during the given control-channel cycles of IS-856 forward link $FL_1$ assigned to hybrid-access-terminal group 16. Each SectorParameters control-channel message may contain information about IS-856 wireless link $WL_1$, including a list of wireless links that neighbor IS-856 wireless link $WL_1$ (i.e., a "neighbor list"). The size of this neighbor list may vary depending on the configuration of access network 12 (e.g., from 0 neighbors to as many as 40 neighbors), and the size of a SectorParameters control-channel message may vary proportionally to the size of this neighbor list (e.g., from 302 bits to 662 bits). As such, access network 12 may impose a cap on the size of a SectorParameters control-channel message for IS-856 wireless link $WL_1$ by imposing a cap on the size of the neighbor list included in the SectorParameters control-channel message. As one example, this neighbor list cap may take the form of a maximum number of neighbors in the neighbor list (e.g., 6 or 7 neighbors), which may be selected to ensure that the neighbor list still includes the nearest neighbors of wireless link $WL_1$. The neighbor list cap may take other forms as well.

In still another aspect of exemplary method 40, in response to determining that hybrid-access-terminal group 16 has missed a threshold extent of tuneaways, access network 12 may remove the coverage area served by IS-856 wireless link $WL_1$ from one or more paging areas and thereby reduce the number of paging messages to send on IS-856 forward link FL' during the given control-channel cycles of IS-856 forward link $FL_1$ assigned to hybrid-access-terminal group 16. For instance, access network 12 may first identify any paging areas that include the coverage area served by IS-856 wireless link $WL_1$, such as by referring to stored data defining pre-defined paging areas for various reference locations in the access network's coverage areas. In turn, access network 12 may calculate a relative distance between a reference location (e.g., a centroid) of the coverage area served by IS-856 wireless link $WL_1$ and a reference location of each such paging area. If the relative distance exceeds a threshold distance value, access network 12 may then remove the coverage area served by IS-856 wireless link $WL_1$ from the paging area, such as by updating the stored data defining the paging area. Other examples are possible as well. As a result of removing the coverage area served by IS-856 wireless link $WL_1$ from the one or more paging areas, access network 12 may thus reduce the number of IS-856 paging messages to send on IS-856 forward link $FL_1$ during all control-channel cycles of IS-856 forward link $FL_1$, including the given control-channel cycles of IS-856 forward link $FL_1$ assigned to hybrid-access-terminal group 16.

At step 52, after deciding to reduce an amount of control-channel data to send on IS-856 forward link $FL_1$ during the given control-channel cycles of IS-856 forward link $FL_1$ assigned to hybrid-access-terminal group 16 in one or more of the manners described above, access network 12 may then begin sending a reduced amount of control-channel data on IS-856 forward link $FL_1$ during the given control-channel cycles of IS-856 forward link $FL_1$ assigned to hybrid-access-terminal group 16.

At step 54, as a result of access network 12 sending a reduced amount of control-channel data on IS-856 forward link $FL_1$ during the given control-channel cycles of IS-856 forward link $FL_1$ assigned to hybrid-access-terminal group 16 (and thus as a result of the one or more hybrid access terminals of hybrid-access-terminal group 16 sending the one or more missed-tuneaway reports), the hybrid access terminals in hybrid-access-terminal group 16 may each receive the reduced amount of control-channel data on IS-856 forward link $FL_1$ during the given control-channel cycles of IS-856 forward link $FL_1$ assigned to hybrid-access-terminal group 16. This reduced amount of control-channel data may enable the hybrid access terminals in hybrid-access-terminal group 16 to receive all relevant control-channel data on IS-856 forward link FL' during the given control-channel cycles of IS-856 forward link $FL_1$ assigned to hybrid-access-terminal group 16, which may reduce the occurrence of missed tuneaways by those hybrid access terminals.

While access network 12 is sending the reduced amount of control-channel data on IS-856 forward link $FL_1$ during the given control-channel cycles of IS-856 forward link $FL_1$ assigned to hybrid-access-terminal group 16, access network 12 may decide to increase an amount of control-channel data to send during the given control-channel cycles of IS-856 forward link $FL_1$ assigned to hybrid-access-terminal group 16 back to a full amount. (As used herein, the phrase "full amount" means the amount of control-channel data access network 12 would send on IS-856 forward link $FL_1$ during the given control-channel cycles of IS-856 forward link $FL_1$ assigned to hybrid-access-terminal group 16 when not reduced according to the techniques described herein). Access network 12 may make this decision based on various criteria. In one example, access network 12 may make this decision based on an absence of missed-tuneaway reports from the hybrid access terminals in hybrid-access-terminal group 16 for a given time period. In another example, access network 12 may make this decision based on a decrease in overall control-channel occupancy. In yet another example, access network 12 may make this decision based on an amount of time during which access network 12 has sent the reduced amount of control-channel data. Other examples are possible as well.

After deciding to increase the amount of control-channel data to send during the given control-channel cycles of IS-856 forward link $FL_1$ assigned to hybrid-access-terminal group 16 back to the full amount, access network 12 may then begin sending the full amount of control-channel data on IS-856 forward link $FL_1$ during the given control-channel cycles of IS-856 forward link $FL_1$ assigned to hybrid-access-terminal group 16. As a result, the hybrid access terminals in hybrid-access-terminal group 16 may each receive the full amount of control-channel data on IS-856 forward link $FL_1$ during the given control-channel cycles of IS-856 forward link $FL_1$ assigned to hybrid-access-terminal group 16.

IV. Exemplary BTS

Figure 4:
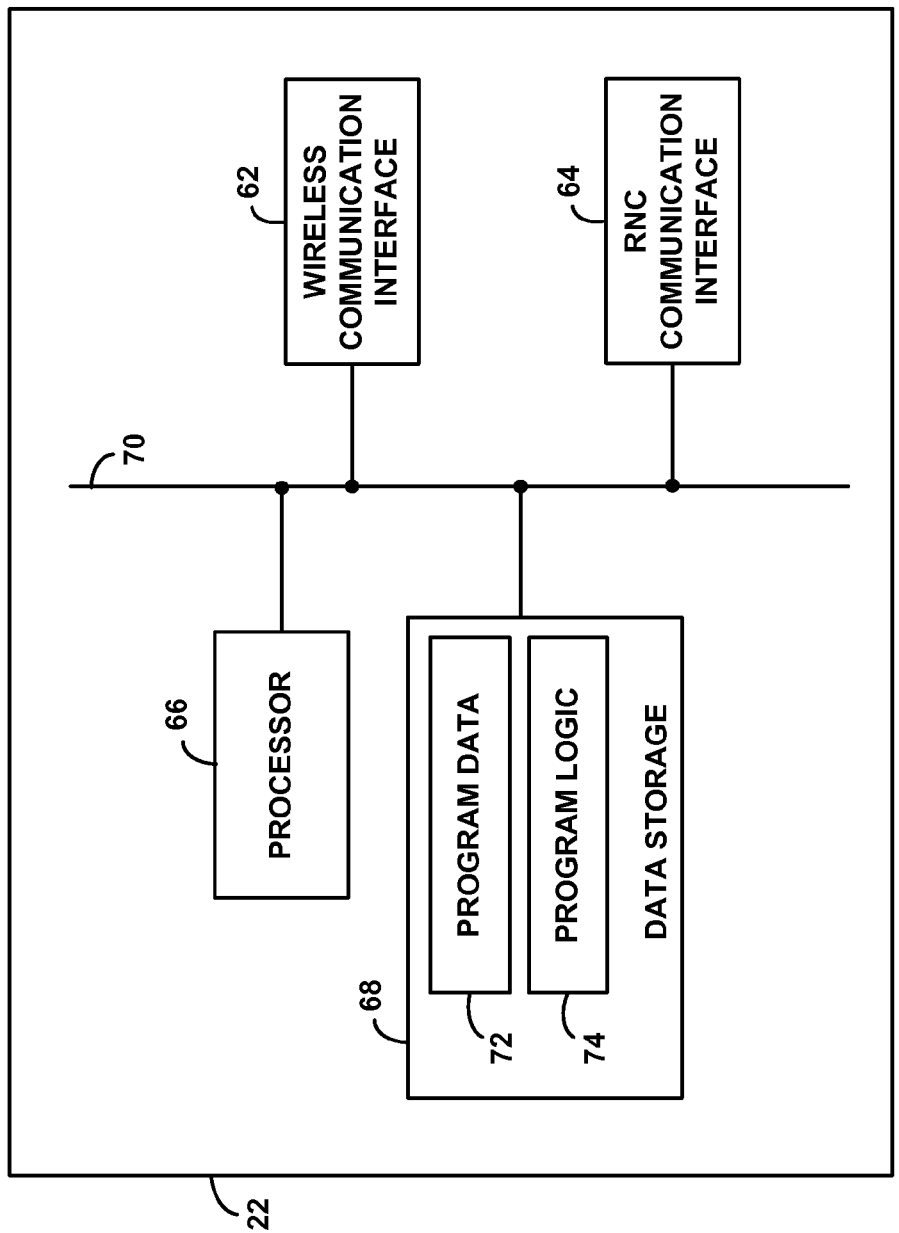
FIG. 4 is a simplified block diagram showing functional components of an exemplary base transceiver station configured to carry out features of the exemplary method of FIG. 3.

FIG. 4 is a simplified block diagram showing functional components of an exemplary BTS, such as BTS 22, that is configured to carry out features of exemplary method 40 described with reference to FIG. 3. (It should be understood, however, that one or more other entities of access network 12, such as RNC 24, may additionally or alternatively be capable carrying out features of exemplary method 40). As shown in FIG. 4, exemplary BTS 22 may include a wireless communication interface 62, an RNC communication interface 64, a processor 66, and data storage 68, all linked together via a system bus, network, or other connection mechanism 70. BTS 22 may include other components as well.

Referring to FIG. 4, wireless communication interface 62 may radiate to define one or more wireless coverage areas and provide one or more wireless links, such as IS-856 wireless link $WL_1$, over which access terminals may communicate with BTS 22. As such, wireless communication interface 62 may include one or more chipsets (e.g., one per protocol) and/or one or more antenna structures arranged in various ways (e.g., one or more directional or sectored antennas). Additionally, wireless communication interface 62 may include at least one power amplifier for each provided wireless link. Other configurations are possible as well.

RNC communication interface 64 may function to communicatively couple BTS 22 to an RNC, such as RNC 24. As such, RNC communication interface 64 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an RNC. RNC communication interface 64 may also include multiple interfaces, such as an Ethernet interface and a serial bus interface. Other configurations are possible as well.

Processor 66 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 68, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some storage mediums may be integrated in whole or in part with the processor 66. Further, some storage mediums may be external to and/or removable from BTS 22 and may interface with BTS 22 in various manners. As shown, data storage 68 may contain (i) program data 72 and (ii) program logic 74, which may be maintained either separately or together within data storage 68.

Program data 72 may contain information relating to the wireless links provided by BTS 22. For example, program data 72 may contain an identifier of each wireless link provided by BTS 22 (e.g., a carrier frequency and a PN offset). As another example, program data 72 may contain identifiers of the forward and/or reverse channels on each wireless link (e.g., MAC IDs and/or Walsh codes). As still another example, program data 72 may contain data defining each coverage area served by each wireless link provided by BTS 22, such as indications of the shape, size, and/or location (e.g., centroid) of each coverage area. As a further example, program data 72 may contain a neighbor list for each wireless link provided by BTS 22. Other examples are possible as well.

Further, program data 72 may contain information relating to one or more access terminals being served by BTS 22. For example, program data 72 may contain an identifier of each such access terminal. As another example, program data 72 may contain an identifier of a wireless link serving each such access terminal. As yet another example, program data 72 may contain an identifier of a control-channel cycle assigned to each such access terminal. As a further example, program data 72 may contain identifiers of any forward and/or reverse channels assigned to each such access terminal (e.g., MAC IDs and/or Walsh codes). Other examples are possible as well.

Further yet, program data 72 may contain information relating to predefined paging areas for various reference locations in the access network's coverage areas. For example, program data 72 may contain data defining predefined paging areas for various reference locations in the access network's coverage areas, such as indications of the shape, size, and/or location of the predefined paging areas. As another example, program data 72 may contain identifiers of the BTSs and/or coverage areas encompassed by the predefined paging areas for various reference locations in the access network's coverage areas. Other examples are possible as well.

Still further, program data 72 may contain information relating to tuneaways missed by one or more hybrid access terminals being served by BTS 22. For example, program data 72 may contain a number of tuneaways missed during a give time period by each such hybrid access terminal. As another example, program data 72 may contain an indicator of whether each such hybrid access terminal has individually missed a threshold extent of tuneaways. As yet another example, program data 72 may contain an indicator of whether a given group of such hybrid access terminals, such as hybrid-access-terminal group 16, has collectively missed a threshold extent of tuneaways. As a further example, program data 72 may contain an indicator of a reason for each missed tuneaway by each such hybrid access terminal. Other examples are possible as well.

Program logic 74 preferably comprises machine-language instructions that may be executed or interpreted by processor 66 to carry out functions in accordance with exemplary method 40 for avoiding missed tuneaways from a first wireless link provided by BTS 22 and configured according to a first protocol (e.g., IS-856 wireless link $WL_1$) to a second wireless link provided by another BTS and configured according to a second protocol (e.g., IS-2000 wireless link $WL_2$). For example, program logic 74 may be executable by processor 66 to (a) receive, from one or more of a group of hybrid access terminals assigned to the same given control-channel cycles of the first wireless link, one or more reports of one or more missed tuneaways from the first wireless link to the second wireless link, (b) based on the received one or more missed-tuneaway reports, determine that the group of hybrid access terminals has missed a threshold extent of tuneaways from the first wireless link to the second wireless link, (c) in response to this determination, decide to reduce an amount of control-channel data to send on the first wireless link during the given control-channel cycles, and then (d) begin to send a reduced amount of control-channel data on the first wireless link during the given control-channel cycles of the first wireless link. Program logic 74 may be executable by processor 66 to carry out various other functions as well.

V. Exemplary Hybrid Access Terminal

Figure 5:
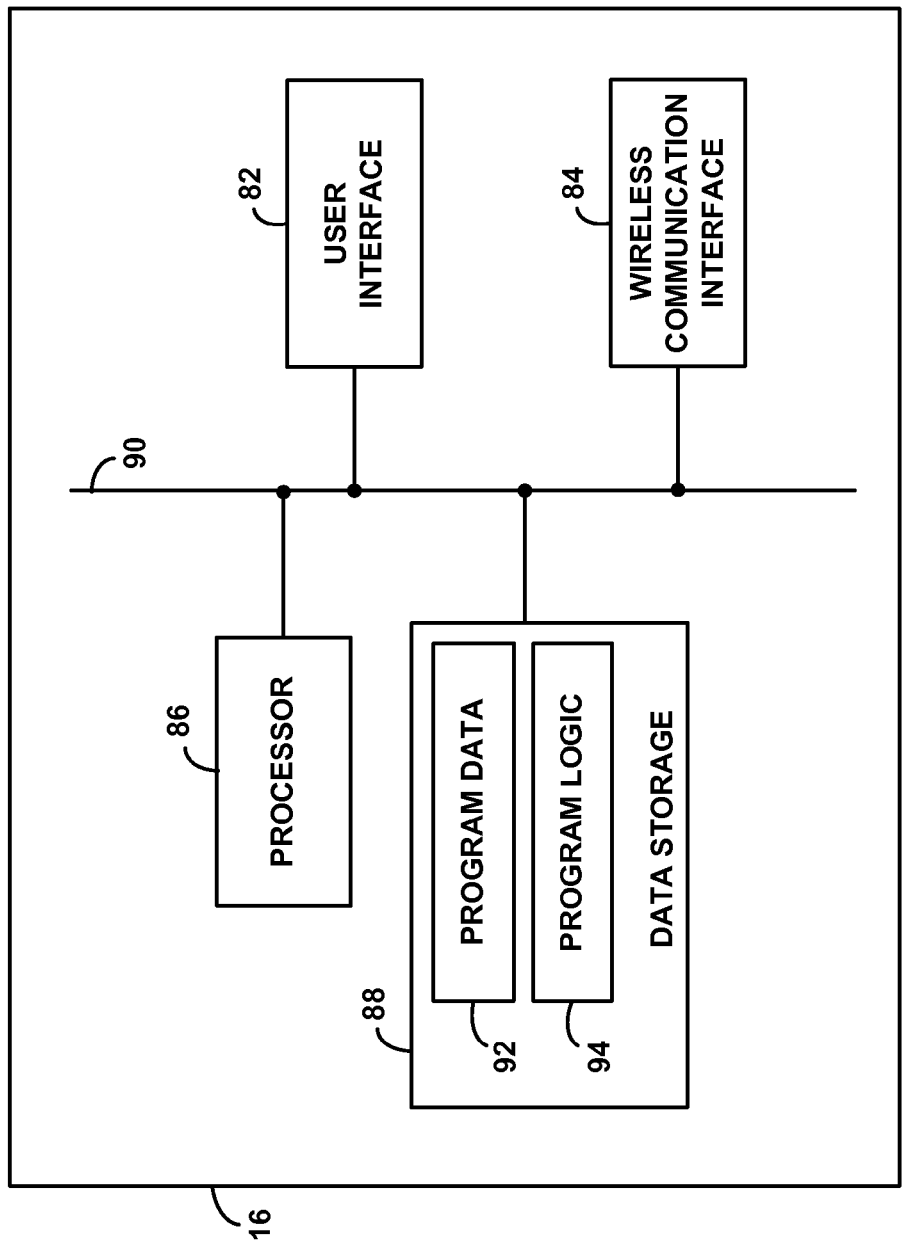
FIG. 5 is a simplified block diagram showing functional components of an exemplary hybrid access terminal configured to carry out features of the exemplary method of FIG. 3.

FIG. 5 is a simplified block diagram showing functional components of an exemplary hybrid access terminal, such as hybrid access terminal 16a, configured to carry out features of exemplary method 40 described with reference to FIG. 3. As shown in FIG. 5, exemplary hybrid access terminal 16a may include a user interface 82, a wireless communication interface 84, a processor 86, and data storage 88, all linked together via a system bus, network, or other connection mechanism 90. Hybrid access terminal 16a may include other components as well.

Referring to FIG. 5, the user interface 82 may be configured to facilitate user interaction with hybrid access terminal 16a. As such, user interface 82 may include or provide connectivity to various components that facilitate user interaction. For example, user interface 82 may include or provide connectivity to input components such as a touch screen, a navigation pad, a multi-functional button, a thumb wheel, a keyboard or keypad, and/or a microphone for instance. As another example, user interface 82 may include or provide connectivity to output components such as a display screen and/or a speaker for instance. As yet another example, user interface 82 may include signal processing components such as analog-to-digital (A-D) and/or digital-to-analog (D-A) circuitry. Other configurations are possible as well.

Wireless communication interface 84 may be configured to facilitate wireless communication with access network 12 according to a first protocol (e.g., IS-856) and access network 14 according to a second protocol (e.g., IS-2000). As such, wireless communication interface 84 may include a first chipset with one or more antennas adapted to communicate according to the first protocol and a second chipset with one or more antennas adapted to communicate according to the second protocol. These chipsets may be separate components or may be integrated together in whole or in part. As one example, the chipsets may be MSM™ series chipsets manufactured by Qualcomm Incorporated of San Diego, Calif. Other configurations are possible as well.

Processor 86 may comprise one or more processor components, such as general-purpose processors (e.g., a microprocessor), application-specific processors (e.g., ASIC or DSP), programmable logic devices (e.g., FPGA), or other processor components now known or later developed. Data storage 108, in turn, may comprise one or more non-transitory computer-readable storage mediums, such as volatile data storage mediums (e.g., RAM, registers, and/or cache) and/or non-volatile data storage mediums (e.g., ROM, a hard disk drive, a solid state drive, flash memory, and/or an optical storage device). Some storage mediums may be integrated in whole or in part with the processor 86. Further, some storage mediums may be external to and/or removable from hybrid access terminal 16a and may interface with hybrid access terminal 16a in various manners. In one example, as shown, data storage 88 may contain (i) program data 92 and (ii) program logic 94, which may be maintained either separately or together within data storage 88.

Program data 92 may contain information relating to wireless links serving hybrid access terminal 16a. For example, program data 92 may contain an identifier of each such wireless link (e.g., a carrier frequency and a PN offset). As another example, program data 92 may contain timing information defining each control-channel cycle and/or timeslot of each such wireless link assigned to hybrid access terminal 16a. As yet another example, program data 92 may contain identifiers of any forward and/or reverse channels of each such wireless link assigned to hybrid access terminal 16a (e.g., MAC IDs and/or Walsh codes). Other examples are possible as well.

Further, program data 92 may contain information relating to tuneaways missed by hybrid access terminal 16a. For example, program data 92 may contain a number of tuneaways missed during a given time period by hybrid access terminal 16a. As another example, program data 92 may contain an indicator of whether hybrid access terminal 16a has missed a threshold extent of tuneaways. As yet another example, program data 92 may contain an indicator of a reason for each missed tuneaway. Other examples are possible as well.

Program logic 94 preferably comprises machine-language instructions that may be executed or interpreted by processor 86 to carry out functions in accordance with exemplary method 40 for avoiding missed tuneaways from a first wireless link provided by a first access network and configured according to a first protocol (e.g., IS-856 wireless link $WL_1$) to a second wireless link provided by a second access network and configured according to a second protocol (e.g., IS-2000 wireless link $WL_2$). For example, program logic 94 may be executable by processor 86 to (a) receive from the first access network on the first wireless link a full amount of control-channel data during given control-channel cycles of the first wireless link assigned to hybrid access terminal 16a, (b) detect one or more missed tuneaways from the first wireless link to the second wireless link, (c) send to the first access network one or more reports of one or more missed tuneaways from the first wireless link to the second wireless link, wherein the one or more missed-tuneaway reports indicate that hybrid access terminal 16a has missed a threshold extent of tuneaways, and (d) as a result of sending the one or more missed-tuneaway reports, receive from the first access network a reduced amount of control-channel data on the first wireless link during the given control-channel cycles of the first wireless link. Program logic 94 may be executable by processor 86 to carry out various other functions as well.

VI. Conclusion

Exemplary embodiments have been described above. Those skilled in the art will understand, however, that changes and modifications may be made to the embodiments described without departing from the true scope and spirit of the present invention, which is defined by the claims.

We claim:

1. A method comprising:
receiving at an access network providing a first wireless link configured according to a first protocol, from one or more of a group of hybrid access terminals assigned to the same given control-channel cycles of the first wireless link, one or more reports of one or more missed tuneaways from the first wireless link to a second wireless link configured according to a second protocol;
based on the received one or more reports, determining that the group of hybrid access terminals has missed a threshold extent of tuneaways from the first wireless link to the second wireless link; and
in response to determining that the group of hybrid access terminals has missed the threshold extent of tuneaways, deciding to reduce an amount of control-channel data to send on the first wireless link during the given control-channel cycles and then beginning to send a reduced amount of control-channel data on the first wireless link during the given control-channel cycles.

2. The method of claim 1, wherein the first protocol comprises an IS-856 protocol and the second protocol comprises an IS-2000 protocol.

3. The method of claim 1, wherein receiving the one or more reports of the one or more missed tuneaways comprises receiving a separate report indicating the occurrence of each missed tuneaway by one of the group of hybrid access terminals.

4. The method of claim 1, wherein receiving the one or more reports of the one or more missed tuneaways comprises receiving a report indicating the occurrence of a threshold extent of tuneaways missed by one of the group of hybrid access terminals.

5. The method of claim 1, wherein determining that the group of hybrid access terminals has missed a threshold extent of tuneaways comprises:
determining a number of hybrid access terminals in the group of hybrid access terminals that have missed a tuneaway within a given time period;
calculating a ratio between the determined number and a total number of hybrid access terminals in the group of hybrid access terminals; and
determining that the calculated ratio exceeds a threshold.

6. The method of claim 1, wherein determining that the group of hybrid access terminals has missed a threshold extent of tuneaways comprises:
calculating a number of tuneaways missed by the group of hybrid access terminals within a given time period; and
determining that the calculated number exceeds a threshold.

7. The method of claim 1, wherein determining that the group of hybrid access terminals has missed a threshold extent of tuneaways comprises determining that one given hybrid access terminal in the group of hybrid access terminals has missed a threshold extent of tuneaways.

8. The method of claim 1, wherein determining that the group of hybrid access terminals has missed a threshold extent of tuneaways comprises determining that the group of hybrid access terminals has missed a threshold extent of tuneaways as a result of being occupied with receiving control-channel data on the first wireless link.

9. The method of claim 1, wherein deciding to reduce an amount of control-channel data to send on the first wireless link during the given control-channel cycles comprises:
deciding to impose a cap on the amount of control-channel data to send on the first wireless link during the given control-channel cycles.

10. The method of claim 1, wherein deciding to reduce an amount of control-channel data to send on the first wireless link during the given control-channel cycles comprises:
deciding to impose a cap on the size of one or more types of control-channel messages to send on the first wireless link during the given control-channel cycles.

11. The method of claim 10, wherein the one or more types of control-channel messages comprises an IS-856 SectorParameters message including a neighbor list for the first wireless link, and wherein deciding to impose a cap on the size of the IS-856 SectorParameters message comprises:
deciding to impose a cap on the size of the neighbor list.

12. The method of claim 1, wherein deciding to reduce an amount of control-channel data to send on the first wireless link during the given control-channel cycles comprises:
removing a coverage area served by the first wireless link from one or more paging areas.

13. The method of claim 12, wherein removing the coverage area served by the first wireless link from one or more paging areas comprises:
identifying a paging area that includes the coverage area served by the first wireless link;
calculating a relative distance between a reference location of the coverage area served by the first wireless link and a reference location of the identified paging area;
comparing the relative distance to a threshold distance value and thereby determining that the relative distance exceeds the threshold value; and
in response to determining that the relative distance exceeds the threshold value, removing the coverage area served by the first wireless link from the identified paging area.

14. The method of claim 1, further comprising:
deciding to increase an amount of control-channel data to send on the first wireless link during the given control cycles back to a full amount and then beginning to send a full amount of control-channel data on the first wireless link during the given control-channel cycles.

15. The method of claim 1, wherein the received one or more reports each include an indication of a reason for the one or more missed tuneaways.

16. A method comprising:
a hybrid access terminal receiving from an access network, on a first wireless link configured according to a first protocol, a full amount of control-channel data during given control-channel cycles of the first wireless link assigned to the hybrid access terminal;
the hybrid access terminal detecting one or more missed tuneaways from the first wireless link to a second wireless link configured according to a second protocol;
the hybrid access terminal sending to the access network one or more reports of one or more missed tuneaways from the first wireless link to the second wireless link, wherein the one or more missed-tuneaway reports indicate that the hybrid access terminal has missed a threshold extent of tuneaways; and
as a result of sending the one or more reports, the hybrid access terminal receiving from the access network, on the first wireless link, a reduced amount of control-channel data during the given control-channel cycles of the first wireless link.

17. The method of claim 16, wherein detecting the one or more missed tuneaways comprises identifying a reason for each of the one or more missed tuneaways.

18. The method of claim 16, wherein sending the one or more reports of the one or more missed tuneaways comprises sending a separate report indicating an occurrence of each missed tuneaway.

19. The method of claim 16, further comprising:
after detecting each of the one or more missed tuneaways, determining whether the hybrid access terminal has missed a threshold extent of tuneaways; and
wherein sending the one or more reports of the one or more missed tuneaways comprises sending a given report indicating an occurrence of a threshold extent of missed tuneaways by the hybrid access terminal.

20. A base transceiver station (BTS) comprising:
a wireless communication interface configured to provide at least a first wireless link configured according to a first protocol;
a radio network controller (RNC) communication interface configured to provide connectivity with an RNC;
a processor;
data storage; and
program instructions stored in data storage and executable by the processor to:
receive, from one or more of a group of hybrid access terminals assigned to given control-channel cycles of the first wireless link, one or more reports of one or more missed tuneaways from the first wireless link to a second wireless link configured according to a second protocol;
based on the received one or more reports, determine that the group of hybrid access terminal has missed a threshold extent of tuneaways from the first wireless link to the second wireless link; and
in response to the determination that the hybrid access terminal has missed the threshold extent of tuneaways, decide to reduce an amount of control-channel data to send on the first wireless link during the given control-channel cycles and then begin to send a reduced amount of control-channel data on the first wireless link during the given control-channel cycles.

* * * * *